Patented Feb. 18, 1936

2,031,095

UNITED STATES PATENT OFFICE 2,031,095

PROCESS FOR SEPARATING WAX FROM OIL

Ulric B. Bray, Palos Verdes Estates, Calif., assignor to Union Oil Company of California, Los Angeles, Calif., a corporation of California No Drawing. Application May 17, 1932, Serial No. 611,933

8 Claims. (Cl. 196—19)

This invention relates to a process for the separation of wax from oil. More specifically, it relates to a process for the separation of wax from petroleum distillates.

In a prior patent application filed by me bearing Serial No. 610,130 and dated May 9, 1932, I described a process for the separation of asphalt and amorphous wax from petroleum residues containing the same. By the process, asphaltic oil residues containing wax are commingled with a light hydrocarbon solvent such as liquid propane which causes precipitation or separation of the asphalt in a finely divided state. The mass is then chilled by vaporizing a portion of the liquid propane under reduced pressure to a temperature sufficiently low to precipitate the wax. The asphalt particles function as nuclear bodies for the agglomeration of the wax precipitated during the chilling operation. The mixture of precipitated wax and asphalt is then separated from the propane solution of oil by such means as filtering, settling or centrifuging. The foregoing process finds application primarily in conjunction with residual oils which have not been distilled overhead, cracked or otherwise treated to convert the wax present to a crystalline form.

When petroleum fractions which contain crystalline wax, as for example wax distillates, are diluted with a light liquid hydrocarbon solvent, such as naphtha or other light hydrocarbon and then chilled, the wax apparently, though not necessarily, crystallizes in the form of plates. Such a mixture cannot be filtered without extreme difficulty because the flat wax crystals form a closely fitting structure which will not permit a free passage of the oil through the filter cake.

I have discovered that oils containing crystalline wax, such as wax distillates, or oils which have been cracked or subjected to treatment conducive to the formation of wax crystals can be more readily dewaxed by adding to such oils an amorphous substance capable of influencing the form in which the wax crystallizes upon chilling the oil. If a small quantity of an amorphous substance, such as asphalt, coal tar pitch, gas tar, viscous or semi-solid compounds obtained as a residue by distilling sulphur dioxide extracts of lubricating oils, or other colloidal high molecular weight organic compounds, is added to a wax distillate or oil fraction containing crystalline wax and the mass is then chilled to a temperature below which the wax is soluble in the oil, the wax forms needle-like crystals. The asphaltic material which I employ may be either a natural asphalt or an asphalt obtained from crude petroleum. This asphalt, as will be understood from the above is preferably substantially insoluble in the oil diluted with the normally gaseous diluent since the portion which does dissolve at the wax crystallizing temperature tends to contaminate the oil and therefore necessitates further treatment to remove this undesirable product. The chilled oil containing the needle-like crystals can be readily filtered, as these crystals form a permeable filter cake through which the chilled oil readily passes.

It is therefore an object of my invention to separate wax from wax distillates or other petroleum fractions in a highly filterable form.

It is another object of my invention to induce the separation of needle-like wax crystals from petroleum fractions containing wax of a crystalline character by adding amorphous bodies to such fractions and then crystallizing the wax.

It is another object of my invention to add asphaltic bodies to waxy oil fractions containing crystalline wax, to dilute the mixture of waxy oil fractions containing the crystalline wax and asphalt with a light hydrocarbon solvent and then chill the foregoing mass to a temperature sufficiently low to separate wax having a needle-like crystalline structure and then to separate the wax from the oil.

In carrying out my process I add a small quantity of an amorphous substance such as asphalt to a petroleum fraction containing crystalline wax. I then dissolve the waxy oil containing the amorphous material in a diluent capable of dissolving the wax and oil but in which the amorphous substance is substantially insoluble, and remains more or less in suspension in the solvent solution of waxy oil as finely divided discrete particles. The solvent solution of waxy oil is then chilled to a temperature sufficiently low to cause a substantial portion of the wax to precipitate from solution. During the chilling operation the finely divided asphalt particles function as nuclei for the formation of the wax crystals. Furthermore, the asphaltic material influences to a marked degree the structure of the wax crystals which are formed. There is a decided propensity towards the formation of needle-like crystals.

The presence of the asphaltic bodies in the chilled mass of precipitated wax and solvent solution of oil aid materially in the filtering operation. These asphaltic bodies are substantially solid in character and are of a granular nature. During the filtering operation they tend to keep the filter cake porous and permeable to the passage of the chilled oil.

As an example of the method of carrying out my process I collect the overhead fractions which contain wax and which are produced during the distillation of waxy crude oil. These are the fractions which are vaporized when the distillation exceeds a temperature of approximately 450° F. These wax or paraffin distillates or paraffin oils are mixed with about 1.0% of an amorphous substance, such as asphalt. This mixture is then dissolved in a light hydrocarbon solvent in the proportion of about one part of waxy oil to five parts of solvent. The solvent solution of waxy oil is then chilled to a temperature of −10° F. or lower and then filtered to remove the granular asphalt and crystalline wax from the solvent solution of oil. The substantially wax-free oil dissolved in solvent is then distilled to separate the oil from the solvent.

When a more definite crystalline structure is desired, the wax distillate may be redistilled and cracked, and then treated according to the method outlined above.

While I may use any light liquid hydrocarbon, such as naphtha or gasoline, as a diluent or solvent for the waxy oil, I prefer the use of the light liquid hydrocarbons which are normally vaporous at ordinary temperature and pressure. These hydrocarbons include methane, ethane, propane, butane, iso-butane and mixtures thereof. These hydrocarbons are obtained by the rectification of casinghead gasoline by the so-called "stabilizing" method, now conventional in the natural gasoline industry. They are the overhead thus obtained. They are liquefied by compression and cooling in the conventional manner and drawn off into pressure chambers where they are maintained in a liquid state until used. A typical analysis of such a fraction is: 6.72% ethane, 72.20% propane, 19.91% iso-butane and 1.17% normal butane and the necessary pressure to maintain such a fraction in the liquid state is approximately 125 pounds per square inch at 70° F. Such a fraction will hereafter be referred to as liquid propane.

Another advantage of using such a light petroleum fraction as described above is its dual property of functioning as a solvent or diluent and as a refrigerant. The waxy oil containing the amorphous substance is dissolved in the proportion of one part of oil to five parts of liquid propane. The pressure upon the propane solution of waxy oil is reduced and sufficient propane allowed to vaporize to chill the mass to a temperature of −10° F. or lower. At this temperature substantially all of the wax is forced out of solution and about two volumes of the liquid propane originally introduced have been vaporized to produce the necessary refrigeration. The chilled mass is then filtered in the manner described above and the filtered, substantially wax-free oil is distilled to remove the propane from the oil.

The above is to be taken as merely illustrative of one mode of carrying out my invention, and not as limiting, as many variations may be made by those skilled in the art within the scope of the following claims.

I claim:

1. A process for the separation of wax from oil containing wax which does not contain sufficient asphaltic material to promote crystallization of the wax, which comprises mixing said oil with asphalt, commingling said oil and asphalt with a liquefied normally gaseous hydrocarbon solvent to dissolve the oil and wax and precipitate the asphalt, chilling the solvent solution of oil and wax in the presence of the insoluble asphalt to precipitate wax, and separating the wax and asphalt from the oil and solvent.

2. A process for the separation of wax from oil containing wax which does not contain sufficient asphaltic material to promote crystallization of the wax, which comprises mixing said oil with asphalt, commingling said oil and asphalt under superatmospheric pressure with a liquefied normally gaseous hydrocarbon solvent to dissolve the oil and wax and precipitate the asphalt, releasing the pressure on the solvent solution of oil and wax and vaporizing a portion of the solvent to chill the oil and precipitate the wax in the presence of the insoluble asphalt, and removing the asphalt and wax from the oil and remaining solvent.

3. A process for the separation of wax from oil containing wax which does not contain sufficient asphaltic material to promote crystallization of the wax, which comprises mixing said oil with asphalt, commingling said oil and asphalt with liquid propane under superatmospheric pressure to dissolve the oil and wax and precipitate asphalt, releasing the pressure and vaporizing a portion of the propane to chill the oil and precipitate the wax and separating the asphalt and wax from the oil and remaining propane.

4. A process for the separating of wax from oil containing wax which does not contain sufficient asphaltic material to promote crystallization of the wax, which comprises mixing said oil with asphalt, commingling said oil and asphalt with liquid propane to dissolve the oil and wax and precipitate the asphalt, chilling the propane solution of oil and wax in the presence of the insoluble asphalt to precipitate wax, removing the asphalt and wax from the oil and propane and removing the propane from the substantially wax free oil.

5. A process for the separation of wax from oil containing wax which does not contain sufficient asphalt to promote crystallization of the wax which comprises mixing said oil with asphalt, commingling said oil with a liquefied normally gaseous hydrocarbon solvent to dissolve the oil and wax and precipitate the asphalt, chilling the solvent solution of oil and wax to separate wax, removing the asphalt and wax from the oil and liquefied normally gaseous hydrocarbon and removing the liquefied normally gaseous hydrocarbon from the oil.

6. A process for the separation of wax from oil distillates containing wax which does not contain sufficient asphalt to promote crystallization of the wax which comprises mixing said oil with asphalt, commingling said oil containing asphalt with liquid propane to dissolve the oil and wax and precipitate the asphalt, vaporizing a portion of the liquid propane from the propane solution of oil and wax to separate wax, separating the asphalt and wax from the oil and remaining propane and removing the remaining propane from the oil.

7. A process for the separation of wax in a filterable form from oil which does not contain sufficient asphalt to promote the formation of filterable wax which comprises mixing said oil with asphalt, commingling said oil and asphalt with a liquefied normally gaseous hydrocarbon solvent to dissolve the oil and wax, chilling the solvent solution of oil and wax in the presence of asphalt to precipitate wax and filtering the asphalt and wax from the oil dissolved in said solvent.

8. A process as in claim 7 in which the chilling is produced by vaporizing a portion of the liquefied normally gaseous hydrocarbon solvent.

ULRIC B. BRAY.